(12) United States Patent
Huang et al.

(10) Patent No.: US 11,385,504 B2
(45) Date of Patent: Jul. 12, 2022

(54) TRANSFER PLATE, METHOD FOR MANUFACTURING DISPLAY PANEL, AND DISPLAY PANEL

(71) Applicant: WUHAN CHINA STAR OPTOELECTRONICS TECHNOLOGY CO., LTD., Hubei (CN)

(72) Inventors: Jianlong Huang, Hubei (CN); Wei Tang, Hubei (CN)

(73) Assignee: WUHAN CHINA STAR OPTOELECTRONICS TECHNOLOGY CO., LTD., Wuhan Hubei (CN)

(*) Notice: Subject to any disclaimer, the term of this patent is extended or adjusted under 35 U.S.C. 154(b) by 265 days.

(21) Appl. No.: 16/632,443

(22) PCT Filed: Nov. 6, 2019

(86) PCT No.: PCT/CN2019/115882
§ 371 (c)(1),
(2) Date: Jan. 20, 2020

(87) PCT Pub. No.: WO2021/056696
PCT Pub. Date: Apr. 1, 2021

(65) Prior Publication Data
US 2022/0004062 A1    Jan. 6, 2022

(30) Foreign Application Priority Data
Sep. 23, 2019   (CN) .......................... 201910899673.8

(51) Int. Cl.
*G02F 1/1337* (2006.01)

(52) U.S. Cl.
CPC .............................. *G02F 1/133765* (2021.01)

(58) Field of Classification Search
CPC ................................................. G02F 1/133765
See application file for complete search history.

(56) References Cited

U.S. PATENT DOCUMENTS

| 6,016,181 A | * | 1/2000 | Shimada | G02F 1/13394 |
| | | | | 349/156 |
| 2006/0092359 A1 | | 5/2006 | Lee | |
| 2014/0320789 A1 | * | 10/2014 | Son | G02F 1/1339 |
| | | | | 349/123 |

FOREIGN PATENT DOCUMENTS

| CN | 202256967 U | * | 5/2012 | .......... G02F 1/1337 |
| CN | 202256967 U | | 5/2012 | |
| CN | 105137662 A | | 12/2015 | |
| CN | 110109279 A | | 8/2019 | |
| CN | 209327746 U | | 8/2019 | |
| KR | 20040062016 A | * | 7/2004 | ....... G02F 1/133784 |

* cited by examiner

*Primary Examiner* — Donald L Raleigh

(57) ABSTRACT

Embodiments of the present disclosure provide a transfer plate, a method for manufacturing a display panel, and the display panel. The transfer plate is configured to form an alignment film of a display panel. The display panel includes a display region and a light signal transmission region. The transfer plate includes a bottom plate and a protruding plate fixed to the bottom plate. The protruding plate includes a first area corresponding to the light signal transmission region, a first protruding structure is disposed in the first area, and a shape of the first protruding structure is adapted to a shape of the light signal transmission region.

12 Claims, 2 Drawing Sheets

TRANSFER PLATE, METHOD FOR MANUFACTURING DISPLAY PANEL, AND DISPLAY PANEL

TECHNICAL FIELD

The present disclosure relates to the field of display technology, and specifically to a transfer plate, a method for manufacturing a display panel, and the display panel.

BACKGROUND

In the liquid crystal display industry, the emergence of through-hole technology allows camera holes or sensing holes of sensors to be arranged in a display area, thus greatly improving screen ratio. However, a though hole area is completely hollow because of film structure arrangement of an array substrate and a color filter substrate, which results in a thickness of the though hole area being different from that of a liquid crystal layer in the display area, and liquid crystals in the though hole area being spirally arranged after alignment, which leads to interference pattern and other problems; at the same time, light transmittance is affected due to alignment films in the though hole area.

SUMMARY

The present disclosure is to provide a transfer plate, a method for manufacturing a display and a display to solve a problem of an interference pattern, for improvement of display quality.

An embodiment of the present disclosure provides a transfer plate of forming alignment films of a display. The display has a display region and a light signal transmission region. The transfer plate includes a bottom plate and a protruding plate fixed to the bottom plate, wherein the protruding plate comprises a first area corresponding to the light signal transmission region, a first protruding structure is disposed in the first area, a shape of the first protruding structure is adapted to a shape of the light signal transmission region.

In an embodiment of the present disclosure providing a transfer plate of forming alignment films of a display, the protruding plate further comprises a second area original translation corresponding to the display region, and a plurality of second protruding structures are distributed in the second area.

In an embodiment of the present disclosure providing a transfer plate of forming alignment films of a display, the plurality of second protruding structures are spaced apart and uniformly distributed in the second area.

In an embodiment of the present disclosure providing a transfer plate of forming alignment films of a display, the first protruding structure and the plurality of second protruding structures are truncated cones, a surface area of a side of the first protruding structure neighboring the bottom plate is greater than a surface area of a side of the first protruding structure away from the bottom plate, and a surface area of a side of the second protruding structures neighboring the bottom plate is greater than a surface area of a side of the second protruding structures away from the bottom plate.

In an embodiment of the present disclosure providing a transfer plate of forming alignment films of a display, the first protruding structure and the plurality of second protruding structures are truncated pyramids.

An embodiment of the present disclosure further provides a display including a display region and a light signal transmission region, the display comprises an array substrate, a color filter substrate, and a liquid crystal layer disposed between the array substrate and the color filter substrate; wherein a first alignment film is disposed on a surface of a side of the array substrate facing the liquid crystal layer, the first alignment film comprises a first through hole, a second alignment film is disposed on a surface of a side of the color filter substrate facing the liquid crystal layer, the second alignment film comprises a second through hole, and the first through hole corresponds to the second through hole.

In an embodiment of the present disclosure providing a display, the first alignment film and the second alignment film are formed by a transfer plate, and the transfer plate comprises a bottom plate and a protruding plate fixed to the bottom plate, wherein the protruding plate comprises a first area corresponding to the light signal transmission region, a first protruding structure is disposed in the first area, and a shape of the first protruding structure is adapted to a shape of the light signal transmission region.

In an embodiment of the present disclosure providing a display, the protruding plate further comprises a second area corresponding to the display region, a plurality of second protruding structures are distributed in the second area, and the plurality of second protruding structures are spaced apart and uniformly distributed in the second area.

In an embodiment of the present disclosure providing a display, the first protruding structure and the plurality of second protruding structures are truncated cones, a surface area of a side of the first protruding structure neighboring the bottom plate is greater than a surface area of a side of the first protruding structure away from the bottom plate, and a surface area of a side of the second protruding structures neighboring the bottom plate is greater than a surface area of a side of the second protruding structures away from the bottom plate.

In an embodiment of the present disclosure providing a display, the first protruding structure and the plurality of second protruding structures are truncated pyramids.

In an embodiment of the present disclosure providing a display, the transfer plate is a photosensitive resin plate.

Embodiments of the disclosure provide a transfer plate, a method for manufacturing a display panel, and the display panel. Alignment films of an array substrate and a color filter substrate are disposed by the transfer plate to make areas of the alignment films corresponding to a light transmissive blind hole be through holes, thus allowing configuration of the areas without alignment liquid, thereby improving light transmission rate of a blind hole area. Therefore, light becomes directionless after passing through the blind hole area, which diminishes interference pattern and thus improves display quality.

DETAILED DESCRIPTION OF PREFERRED EMBODIMENTS

Reference will now be made in detail to embodiments, examples of which are illustrated in the accompanying drawings. Wherein, same or similar reference numbers always represent same or similar elements or elements with same or similar functions. The embodiments described with reference to the drawings are exemplary, and are just used for explaining the invention, not for limiting the invention.

In description of the disclosure, it should be understood that orientational or positional relationships represented by directional terms mentioned in the present disclosure, such as central, longitudinal, lateral, length, width, thickness, up, down, front, rear, left, right, vertical, horizontal, top, bottom, clockwise, anticlockwise, etc., are orientational or positional relationships based on the drawings, and are merely for the convenience of describing the present disclosure and simplifying the description, rather than indicating or implying that the device or element is intended to have a particular orientation, or is constructed and operated in a particular orientation, and therefore, should not be interpreted as a limitation of the application. In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the disclosure, "a plurality of" means two or more than two, unless otherwise specified.

Figure 1:
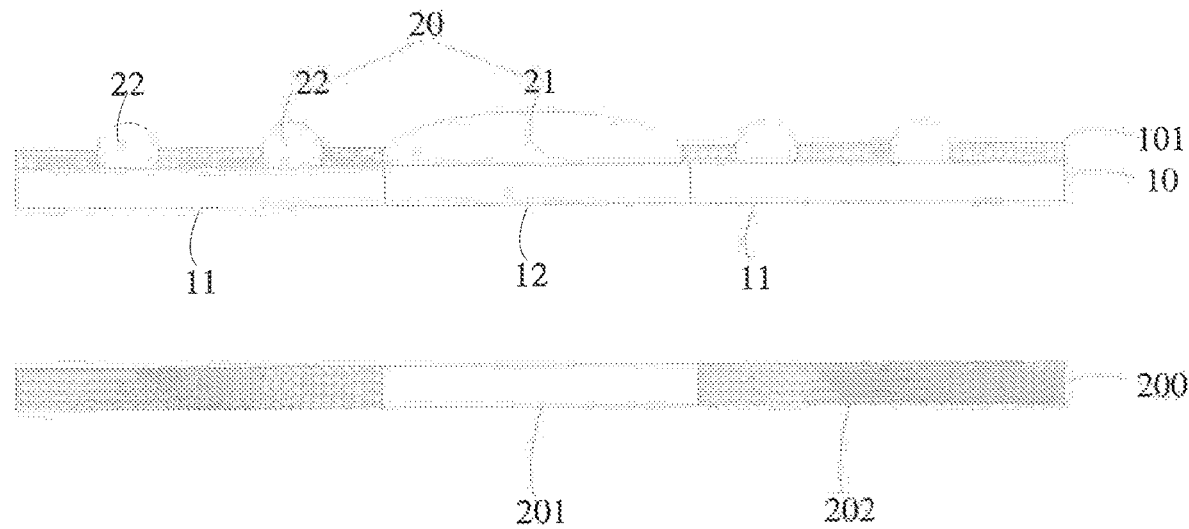
FIG. 1 is a schematic structure diagram illustrating a transfer plate, according to an embodiment of the present disclosure.

Please refer to FIG. 1, which is a schematic structure diagram illustrating a transfer plate for forming alignment films of a display panel, according to an embodiment of the present disclosure.

Wherein, a display panel 200 has a display region 202 and a light signal transmission region 201, the transfer plate comprises a bottom plate 10 and a protruding plate 20 fixed to the bottom plate 10; wherein, the protruding plate 20 comprises a first area and a second area, the first area corresponds to the light signal transmission region 201, a first protruding structure 21 is disposed in the first area, and a shape of the first protruding structure 21 is adapted to a shape of the light signal transmission region 201. The second area corresponds to the display region 202, and a plurality of second protruding structures 22 are distributed in the second area. Wherein, alignment liquid on the transfer plate is distributed in a gap between the first protruding structure 21 and the second protruding structures 22, or between any two neighboring second protruding structures 22. Because the first protruding structure 21 has a larger surface area than that of the second protruding structures 22 and fully covers the first area, the light signal transmission region 201 of the display panel 200 will not be coated with alignment liquid during transfer of alignment layer.

In some embodiments, the plurality of second protruding structures 22 are spaced apart and uniformly distributed in the second area. The first area of the protruding plate 20 corresponds to a third area of the bottom plate 10, and the second area of the protruding plate 20 corresponds to a fourth area of the bottom plate 10.

Wherein, the first protruding structure 21 and the plurality of second protruding structures 22 are of a truncated cone shape, a surface area of a side of the first protruding structure 21 neighboring the bottom plate 10 is greater than a surface area of a side of the first protruding structure 21 away from the bottom plate 10, and a surface area of a side of the second protruding structures 22 neighboring the bottom plate 10 is greater than a surface area of a side of the second protruding structures 22 away from the bottom plate 10. It is understood that the first protruding structure 21 and the plurality of second protruding structures 22 can also be of a truncated pyramid shape.

Wherein, in some embodiments, the transfer plate is a photosensitive resin plate.

Figure 2:
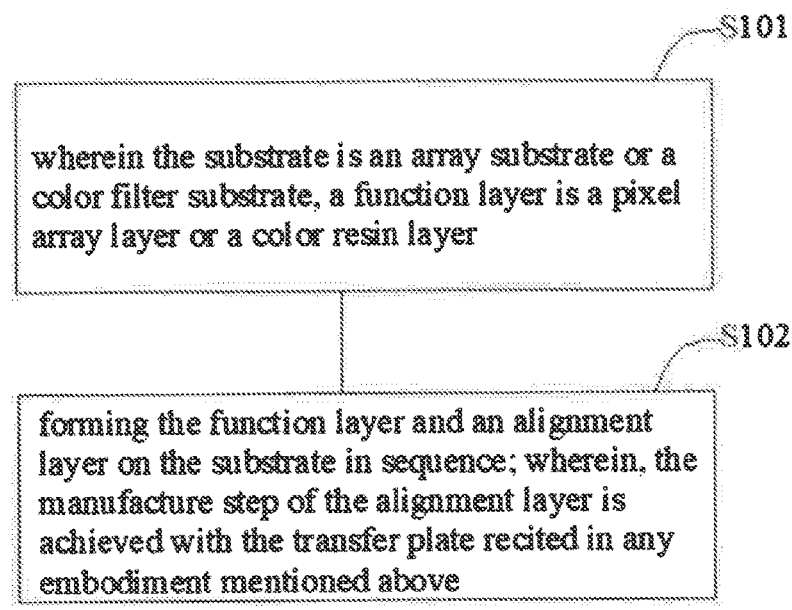
FIG. 2 is a flowchart illustrating a method for manufacturing a display panel, according to an embodiment of the present disclosure.

As shown in FIG. 2, a method for manufacturing a display panel comprises:

S101: providing a substrate, wherein the substrate is an array substrate or a color filter substrate, and a function layer is a pixel array layer or a color resin layer.

S102: forming the function layer and an alignment layer on the substrate in sequence, wherein the manufacturing step of the alignment layer is achieved with the transfer plate recited in any embodiment mentioned above.

Embodiments of the disclosure provide a method for manufacturing a display panel. Alignment films of an array substrate and a color filter substrate are disposed by a transfer plate to make areas of the alignment films corresponding to a light transmissive blind hole be through holes, thus allowing configuration of the areas without alignment liquid, thereby improving light transmission rate of a blind hole area. Therefore, light becomes directionless after passing through the blind hole area, which diminishes interference pattern and thus improves display quality.

Figure 3:
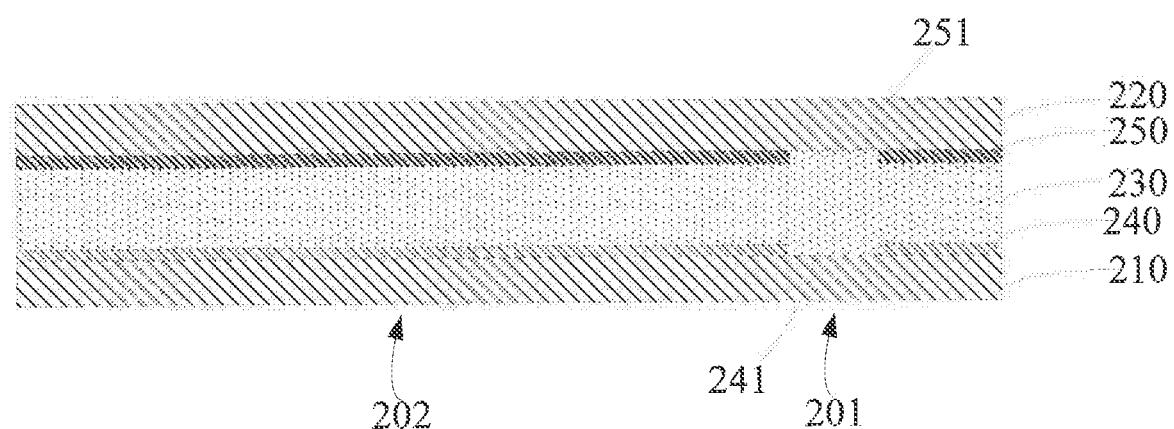
FIG. 3 is a schematic structure diagram illustrating a display panel, according to an embodiment of the present disclosure.

Please refer to FIG. 3, which illustrates a structural diagram illustrating a display panel, according to some embodiments of the present disclosure. Wherein, viewed in a horizontal direction, the display panel 200 includes a display region 202 and a light signal transmission region 201. Viewed in a vertical direction, the display panel 200 comprises an array substrate 210, a color filter substrate 220, and a liquid crystal layer 230 located between the array substrate 210 and the color filter substrate 220.

Wherein, a first alignment film 240 is disposed on a surface of a side of the array substrate 210 facing the liquid crystal layer 230, the first alignment film 240 comprises a first through hole 241, a second alignment film 250 is disposed on a surface of a side of the color filter substrate 220 facing the liquid crystal layer 230, the second alignment film 250 comprises a second through hole 251, and the first through hole 241 corresponds to the second through hole 251.

Wherein, the first alignment film 240 and the second alignment film 250 are formed by one transfer plate, which is the transfer plate recited in the embodiments mentioned above. As show in FIG. 1, the transfer plate comprises a bottom plate 10 and a protruding plate 20 fixed to the bottom plate 10; wherein, the protruding plate 20 comprises a first area and a second area, the first area corresponds to the light signal transmission region 201, a first protruding structure 21 is disposed in the first area, and a shape of the first protruding structure 21 is adapted to a shape of the light signal transmission region 201. The second area corresponds to the display region 202, and a plurality of second protruding structures 22 are distributed in the second area. Wherein, alignment liquid on the transfer plate is distributed in a gap between the first protruding structure 21 and the second protruding structures 22, or between any two neighboring second protruding structures 22. Because the first protruding structure 21 has a larger surface area than that of the second protruding structures 22 and fully covers the first area, the light signal transmission region 201 of the display panel 200 will not be coated with alignment liquid during transfer of alignment layer.

Embodiments of the disclosure provide a transfer plate, a method for manufacturing a display, and a display. Alignment films of an array substrate and a color filter substrate are disposed by a transfer plate to make areas of the alignment films corresponding to a light transmissive blind hole be through holes, thus to make the areas configured with no alignment liquid, for improvement of light transmission ratio of a blind hole area. Therefore, light will be directionless after passing through the blind hole area, which diminishes an interference pattern, which improves display quality.

Although the present disclosure has been disclosed in the above preferred embodiments, the above preferred embodiments do not intend to limit the present disclosure. Various modifications and changes may be made by ordinary person skilled in the art without departing from the spirit and scope of this application. Therefore, the scope of protection of this application is subject to the scope defined by the claims.

What is claimed is:

1. A transfer plate for forming alignment films of a display panel, wherein the display panel comprises a display region and a light signal transmission region, the transfer plate comprising:
    a bottom plate; and
    a protruding plate fixed to the bottom plate, wherein the protruding plate comprises a first area corresponding to the light signal transmission region, a first protruding structure is disposed in the first area, and a shape of the first protruding structure is adapted to a shape of the light signal transmission region so that the first protruding structure fully covers the first area and the light signal transmission region is not coated with the alignment film.

2. The transfer plate for forming alignment films of the display panel as claimed in claim 1, wherein the protruding plate further comprises a second area corresponding to the display region, and a plurality of second protruding structures are distributed in the second area.

3. The transfer plate for forming alignment films of the display panel as claimed in claim 2, wherein the plurality of second protruding structures are spaced apart and uniformly distributed in the second area.

4. The transfer plate for forming alignment films of the display panel as claimed in claim 3, wherein the first protruding structure and the plurality of second protruding structures are truncated cones, a surface area of a side of the first protruding structure neighboring the bottom plate is greater than a surface area of a side of the first protruding structure away from the bottom plate, and a surface area of a side of the second protruding structures neighboring the bottom plate is greater than a surface area of a side of the second protruding structures away from the bottom plate.

5. The transfer plate for forming alignment films of the display panel as claimed in claim 3, wherein the first protruding structure and the plurality of second protruding structures are truncated pyramids.

6. The transfer plate for forming alignment films of the display panel as claimed in claim 1, wherein the transfer plate is a photosensitive resin plate.

7. A display panel including a display region and a light signal transmission region, wherein the display panel comprises:
    an array substrate;
    a color filter substrate; and
    a liquid crystal layer disposed between the array substrate and the color filter substrate;
    wherein a first alignment film is disposed on a surface of a side of the array substrate facing the liquid crystal layer, the first alignment film comprises a first through hole, a second alignment film is disposed on a surface of a side of the color filter substrate facing the liquid crystal layer, the second alignment film comprises a second through hole, and the first through hole corresponds to the second through hole; and
    wherein no alignment film is provided in the region of the array substrate corresponding to the first through hole and the region of the color filter substrate corresponding to the second through hole.

8. The display panel as claimed in claim 7, wherein the first alignment film and the second alignment film are formed by a transfer plate, and the transfer plate comprises a bottom plate and a protruding plate fixed to the bottom plate, wherein the protruding plate comprises a first area corresponding to the light signal transmission region, a first protruding structure is disposed in the first area, and a shape of the first protruding structure is adapted to a shape of the light signal transmission region.

9. The display panel as claimed in claim 8, wherein the protruding plate further comprises a second area corresponding to the display region, a plurality of second protruding structures are distributed in the second area, and the plurality of second protruding structures are spaced apart and uniformly distributed in the second area.

10. The display panel as claimed in claim 9, wherein the first protruding structure and the plurality of second protruding structures are truncated cones, a surface area of a side of the first protruding structure neighboring the bottom plate is greater than a surface area of a side of the first protruding structure away from the bottom plate, and a surface area of a side of the second protruding structures neighboring the bottom plate is greater than a surface area of a side of the second protruding structures away from the bottom plate.

11. The display panel as claimed in claim 9, wherein the first protruding structure and the plurality of second protruding structures are truncated pyramids.

12. The display panel as claimed in claim 7, wherein the transfer plate is a photosensitive resin plate.

* * * * *